(No Model.)
N. W. KROUSE.
FRUIT JAR.
No. 308,174. Patented Nov. 18, 1884.
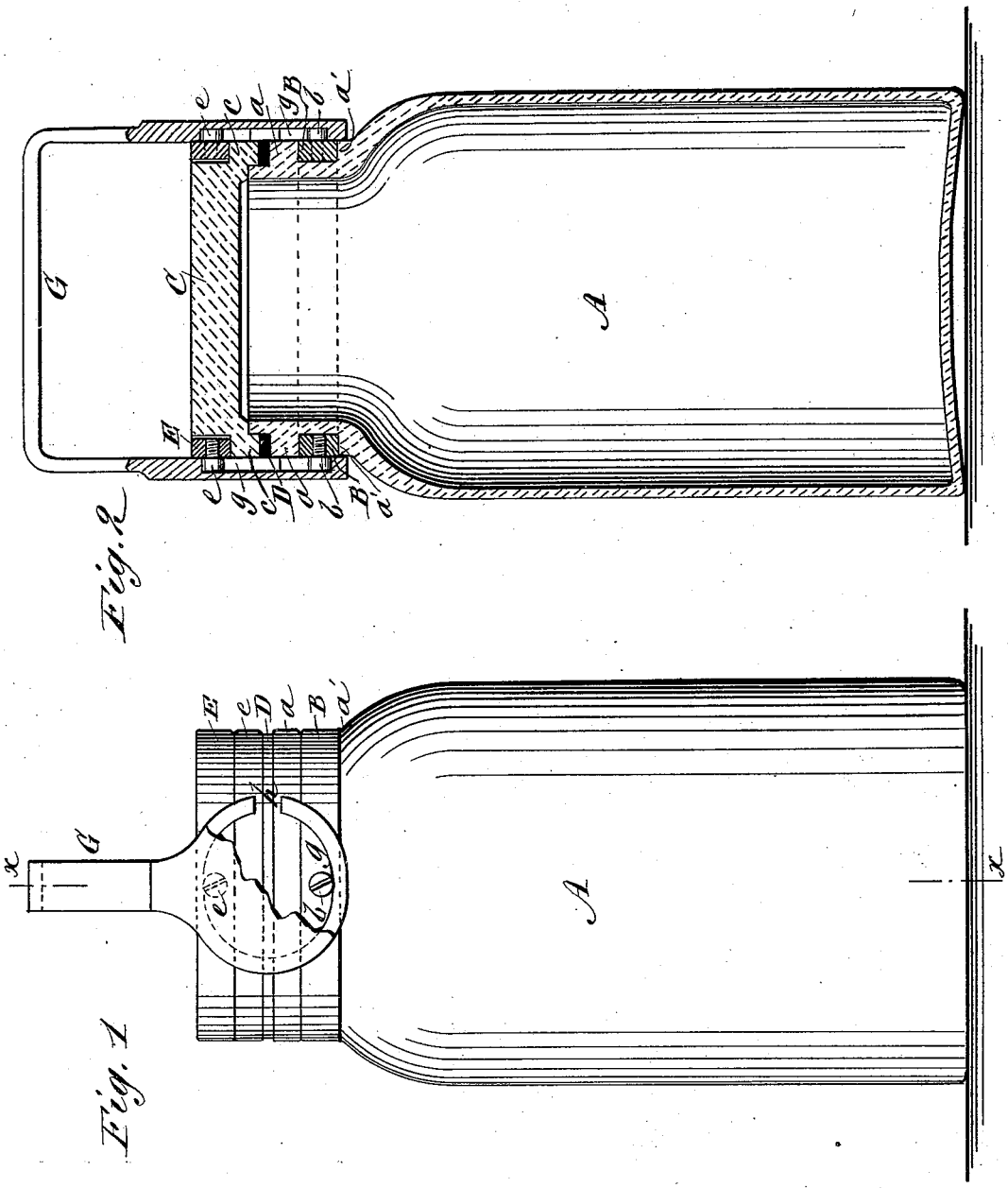
WITNESSES:
C. Neveux
C. Sedgwick
INVENTOR:
N. W. Krouse
BY Munn & Co
ATTORNEYS.

UNITED STATES PATENT OFFICE.

NATHANIEL W. KROUSE, OF HAYSVILLE, PENNSYLVANIA.

FRUIT-JAR.

SPECIFICATION forming part of Letters Patent No. 308,174, dated November 18, 1884.

Application filed March 27, 1884. (No model.)

*To all whom it may concern:*

Be it known that I, NATHANIEL W. KROUSE, of Haysville, in the county of Butler and State of Pennsylvania, have invented certain new and useful Improvements in Fruit and other Jars, of which the following is a full, clear, and exact description.

This invention is more particularly designed to be applied to glass fruit-jars; and it consists in the construction and arrangement of parts, as will be hereinafter fully described and claimed.

Reference is to be had to the accompanying drawings, forming part of this specification, in which similar letters of reference indicate corresponding parts in both the figures.

Figure 1 represents a side view of a fruit-jar sealed or closed and embodying my invention, the cover-closing device being partly in section. Fig. 2 is a vertical section of the same on the line $x$ $x$ in Fig. 1.

A indicates a glass fruit-jar made with a flange, $a$, near its top or mouth, which is made smaller than the body of the jar, and so as to leave an additional flange, $a'$, below the flange $a$.

B is a metal ring, which may be made non-detachable and is arranged between the flanges $a$ $a'$ to hold it rigid and in place. This ring may be placed in the mold in the manufacture of the jar and the glass be blown around it, thereby fixing it permanently to the jar. Said ring bears, when in operation, against the under side of the jar-flange and is provided with two opposite side lugs or projections, $b$ $b$.

C is the cover of the jar, also made of glass and constructed to fit on or over the mouth of the jar, and to form a flange, $c$, on the exterior thereof over the flange $a$ of the jar. Between these flanges $a$ and $c$ is arranged a soft rubber or other gasket, D.

E is a loose metal ring, arranged to fit on the flange $c$ of the cover. This ring is similar to the ring B, and, like it, is provided with opposite side lugs or projections, $e$ $e$. The cover, rings, and gasket all having been arranged in their places, as described, for the purpose of closing the mouth of the jar, a bail, G, of peculiar construction is then applied to the jar to forcibly press down or seal the cover and to form a convenient means by which to carry or handle the closed jar. This bail is of enlarged construction at its lower ends, and is made with a cavity, $g$, within such portions of elliptical or approximately oval shape with its minor axis in direction of the length of the bail. An opening or open-ended slot, $h$, is made at one end of its major axis; or, in other words, said enlarged lower end portions of the bail are made to form inner cam-surfaces having through-openings on one side where they are widest.

To lock or seal the cover C by means of this cam-lever or bail, the ring E is adjusted relatively to the ring B to bring their lugs $b$ and $e$ respectively in line over each other, and the cam-lever or bail G then passed by its slots $h$ over said lugs or projections and afterward raised to an upright position, which will cause the inner walls of the cam-shaped openings $g$ to exert a powerful action having a tendency to draw the rings B and E together, compressing the gasket D, and so to tightly close or seal the cover C sufficiently to exclude air from interfering with the preservation of the fruit. At the same time this cam-lever will form a bail by which to carry or handle the jar when closed.

The construction, it will be observed, is such that when the cover C as well as the jar are of glass, the contents will only be exposed, as hereinbefore mentioned, to contact with glass.

To open the jar, it is only necessary to turn down the cam-lever or bail G sufficiently to allow of the same by its slots $h$ being slipped from or off the lugs $b$ $e$ of the rings B E, when the lid C is free to be removed.

Having thus described my invention, what I claim as new, and desire to secure by Letters Patent, is—

1. The cam-lever G, in combination with the rings B E, having opposite side lugs or projections, $b$ $e$, the cover C, and the flange $a$ at or around the mouth of the jar, essentially as described.

2. The detachable cover-closing lever G, constructed to also form a bail or handle for the jar and made with cam-shaped cavities or openings *g* and slots *h* at its lower ends, in combination with the jar A, having a flange, *a*, at or near its mouth constructed to receive upon it a gasket, D, the removable cover C, and the rings or bands B E, having lugs or projections *b e* for the cam-lever to engage with, substantially as and for the purposes specified.

NATHANIEL W. KROUSE.

Witnesses:
HARRY WILLIAMS,
H. W. LOCKE.